US008144141B2

(12) United States Patent
Hirose et al.

(10) Patent No.: US 8,144,141 B2
(45) Date of Patent: Mar. 27, 2012

(54) LIQUID CRYSTAL DISPLAY

(75) Inventors: Yoichi Hirose, Tokyo (JP); Tsuyoshi Kamada, Kanagawa (JP)

(73) Assignee: Sony Corporation (JP)

( * ) Notice: Subject to any disclaimer, the term of this patent is extended or adjusted under 35 U.S.C. 154(b) by 370 days.

(21) Appl. No.: 12/586,528

(22) Filed: Sep. 23, 2009

(65) Prior Publication Data

US 2010/0079429 A1 Apr. 1, 2010

(30) Foreign Application Priority Data

Sep. 25, 2008 (JP) ................................ P2008-245889

(51) Int. Cl.
*G06F 3/041* (2006.01)

(52) U.S. Cl. ............... 345/209; 345/96; 345/38; 345/48

(58) Field of Classification Search ......................... None
See application file for complete search history.

(56) References Cited

U.S. PATENT DOCUMENTS

2005/0140634 A1* 6/2005 Takatori .......................... 345/96
2008/0068359 A1* 3/2008 Yoshida et al. ............... 345/204

FOREIGN PATENT DOCUMENTS

| | | |
|---|---|---|
| JP | 05313620 A | 11/1993 |
| JP | 07245733 A | 9/1995 |
| JP | 07253765 A | 10/1995 |
| JP | 2001-142409 A | 5/2001 |
| JP | 2001-296554 A | 10/2001 |
| JP | 2002006825 A | 1/2002 |
| JP | 2002055662 A | 2/2002 |
| JP | 2002099250 A | 4/2002 |
| JP | 2002182622 A | 6/2002 |
| JP | 2005208314 A | 8/2005 |
| JP | 2005-258403 A | 9/2005 |
| JP | 2007322882 A | 12/2007 |
| JP | 2008067080 A | 3/2008 |
| JP | 2008203292 A | 9/2008 |

OTHER PUBLICATIONS

Office Action from Japanese Application No. 2008-245889, dated Sep. 14, 2010.
Office Action from Japanese Application No. 2008-245889, dated Nov. 24, 2010.
Office Action from Japanese Application No. 2008-245889, dated Jul. 6, 2010.

* cited by examiner

*Primary Examiner* — Muhammad N Edun
(74) *Attorney, Agent, or Firm* — Lerner, David, Littenberg, Krumholz & Mentlik, LLP

(57) ABSTRACT

A liquid crystal display which may suppress image quality deterioration and enhance image contrast is provided. The liquid crystal display includes: a light source unit including a light source having divided lighting sections and a light source control section; a liquid crystal display panel including pixels and modulating light from the light source; and a display driving section performing a polarity inversion driving based on the inputted video signal. The display driving section corrects the inputted video signal, for each of divided display regions in the liquid crystal display panel corresponding to ON-state divided lighting sections, based on a light control signal from the light source control section, so that a amplitude center potential of the driving voltage with a waveform of alternately-inverting polarity substantially agrees with the common potential. The driving voltage based on a corrected video signal is then applied to the liquid crystal element.

5 Claims, 12 Drawing Sheets

LIQUID CRYSTAL DISPLAY

CROSS-REFERENCE TO RELATED APPLICATION

The present application claims priority from Japanese Patent Application No. JP 2008-245889 filed in the Japanese Patent Office on Sep. 25, 2008, the entire content of which is incorporated herein by reference.

BACKGROUND OF THE INVENTION

1. Field of the Invention

The present invention relates to a liquid crystal display employing a light source unit that includes a plurality of divided lighting sections to be separately controlled.

2. Description of the Related Art

In the liquid crystal displays, the transmissive type active matrix liquid crystal display panel with a white backlight is widely used for personal computer monitors (PC monitors) and televisions. Here, it is desired that such active matrix liquid crystal display panel for PC monitors and televisions have high quality of display with less unevenness in display and flickers, etc.

Although the CCFL (Cold Cathode Fluorescent Lamp) type using a fluorescence tube is predominant as a backlight of the liquid crystal display panel, LED (light emitting diode), etc., are highly promising as a light source substituting for the CCFL. As such kinds of backlight system with LED, backlight systems with LED as disclosed in, for example, Japanese Patent Application Publication No. 2001-142409 and Japanese Patent Application Publication No. 2001-296554 have been proposed.

SUMMARY OF THE INVENTION

The above mentioned Japanese Patent Application Publication No. 2001-142409 discloses an LED backlight system which is configured to have the light source divided into a plurality of divided lighting sections and apply a separate light emitting operation to each divided lighting sections so as to control the light quantity. Here, there are two reasons in general for controlling the luminance of the backlight (light intensity). One is to reduce the power consumption independent of any contents to be displayed by implementing a time-averaged reduction of luminance. The other is to improve the display contrast and enhance the effect of image-expression capability by increasing/decreasing the luminance of the backlight in accordance with the contents to be displayed. In particular, the LED backlight system is configured to further increase the sharpness of image contrast by increasing/decreasing the luminance of backlight separately for each divided lighting section in accordance with the contents to be displayed.

By the way, the display driving of the active-matrix liquid crystal display panel is implemented in general by applying an alternating voltage to liquid crystal elements thereof, so as to prevent the image persistence of liquid crystal by means of driving with alternating voltage. In such an alternating voltage drive (polarity inversion driving), voltage of rectangular waveform is applied such that the positive and negative voltages of the equivalent voltage swing with respect to a predetermined reference voltage are applied alternately. The predetermined reference voltage is a direct current voltage applied to a counter substrate that faces the TFT (Thin Film Transistor), and called common electrode voltage or common electrode voltage (generally referred to as "Vcom").

The common electrode voltage (Vcom) is adjusted to the optimal voltage value in the final manufacturing process of a liquid crystal module so as to reduce the occurrence of flicker to the minimum. If modulation of Vcom is inappropriate, the voltage swing is out of balance between the positive/negative portions and the liquid crystal may be always subject to the biased direct current voltage. Under such condition, a same screen image kept for a long time in a static state may cause the image persistence.

Here, in the liquid crystal display panel employing an amorphous silicon (amorphous Si) TFT element, which is a typical one as active matrix liquid crystal panel, when the channel portion of amorphous Si is illuminated, optically-induced electromotive force is generated. Accordingly, the off-leak characteristics may be varied when the light quantity is varied. Such variation of the off-leak characteristics induces a change of pixel voltage held at the liquid crystal at the time of image driving operation with an alternating voltage driving (polarity inversion driving), though just a little.

As mentioned above, Vcom in the liquid crystal display panel is adjusted to the optimal voltage level in the manufacturing process of the liquid crystal module. Accordingly, when the luminance of the backlight is varied, the Vcom deviates from the optimal value due to the above-mentioned alteration of the off-leak characteristics in amorphous Si. When the amount of Vcom deviation from the optimum voltage is so large, that may become the cause of the image persistence, flickers or unevenness in display.

In view of such problem, the above-mentioned Patent Document 2 discloses an art in which the deviation of Vcom due to the variation of the backlight luminance is corrected by correcting the voltage of the counter substrate and the amplitude center voltage of a video signal in accordance with the luminance of the backlight.

However, when the luminance of the backlight is adjusted separately to comply with each of a plurality of divided display regions of the liquid crystal display panel, it is difficult for the art to correct the deviation of Vcom for each of the divided display regions. As a result, there is a possibility of occurrence of image persistence, flickers, unevenness in display, etc. due to the deviation of Vcom from the optimal voltage. Accordingly, implementation of a technique, which is capable of improving the sharpness of image contrast and suppressing the image quality deterioration such as occurrence of the image persistence, flickers and unevenness in display, may be required.

In view of the drawback as described above, it is desirable to provide a liquid crystal display unit in which sharpness of image contrast may be improved while suppressing the image quality deterioration.

A liquid crystal display according to an embodiment of the present invention includes: a light source unit including a light source having a plurality of divided lighting sections to be separately controlled and a light source control section controlling a light quantity of each of the divided lighting sections by a light control signal; a liquid crystal display panel including a plurality of pixels each having a liquid crystal element, a pixel electrode and a common electrode, and modulating light emitted from the light source based on an inputted video signal; and a display driving section performing a polarity inversion driving by applying driving voltages with waveform of alternately-inverting polarity based on the inputted video signal to the pixel electrode of each of the pixels, while maintaining the common electrode at a common potential. The display driving section corrects the inputted video signal, separately for each of divided display regions in the liquid crystal display panel corresponding to ON-state divided lighting sections, based on the light control signal from the light source control section, so that a amplitude center potential of the driving voltage with a waveform of alternately-inverting polarity substantially agrees with the common potential, irrespective of the light quantity of the divided lighting section. Then, the display driving section applies a driving voltage based on a corrected video signal to the liquid crystal element.

According to the liquid crystal display of an embodiment of the present invention, in the liquid crystal display panel, the polarity inversion driving is performed by applying driving voltages with waveform of alternately-inverting polarity based on the inputted video signal to the pixel electrode of each of the pixels, while maintaining the common electrode at a common potential. Thereby, light emitted from the light source unit is modulated based on the inputted video signal, and then images are displayed. At this time, in the light source unit, the light quantity of each of the plurality of divided lighting sections to be separately controlled, is controlled. Accordingly, the light quantity is controlled, separately for each of the divided display regions, in accordance with the inputted video signal. Further, correction of the inputted video signal is performed, separately for each of the divided display regions, so that a amplitude center potential of the driving voltage with a waveform of alternately-inverting polarity substantially agrees with the common potential, irrespective of the light quantity of the divided lighting section, and then the driving voltage based on the corrected video signal is applied to the liquid crystal element. As a result, fluctuation of the amplitude center potential due to the variation of the light quantity of each of the plurality of divided lighting sections is suppressed, and occurrence of the image persistence of liquid crystal, flickers and unevenness in display, etc. due to the electric potential difference of the amplitude center potential and the common potential is suppressed.

According to the liquid crystal display of an embodiment of the present invention, since the light quantity of each of the plurality of divided lighting sections to be separately controlled, is controlled, the light quantity may be controlled, separately for each of the divided display regions, in accordance with the inputted video signal, thereby improving the sharpness of image contrast. Also, correction of the inputted video signal is performed, separately for each of the divided display regions, so that a amplitude center potential of the driving voltage with a waveform of alternately-inverting polarity substantially agrees with the common potential, irrespective of the light quantity of the divided lighting section. Therefore, occurrence of the image persistence of liquid crystal, flickers and unevenness in display, etc. due to the electric potential difference of the amplitude center potential and the common potential is suppressed. As a result, sharpness of image contrast is improved while suppressing the deterioration of image quality.

DESCRIPTION OF THE PREFERRED EMBODIMENTS

Embodiments of the invention will be described in detail hereinbelow with reference to the drawings.

Figure 1:
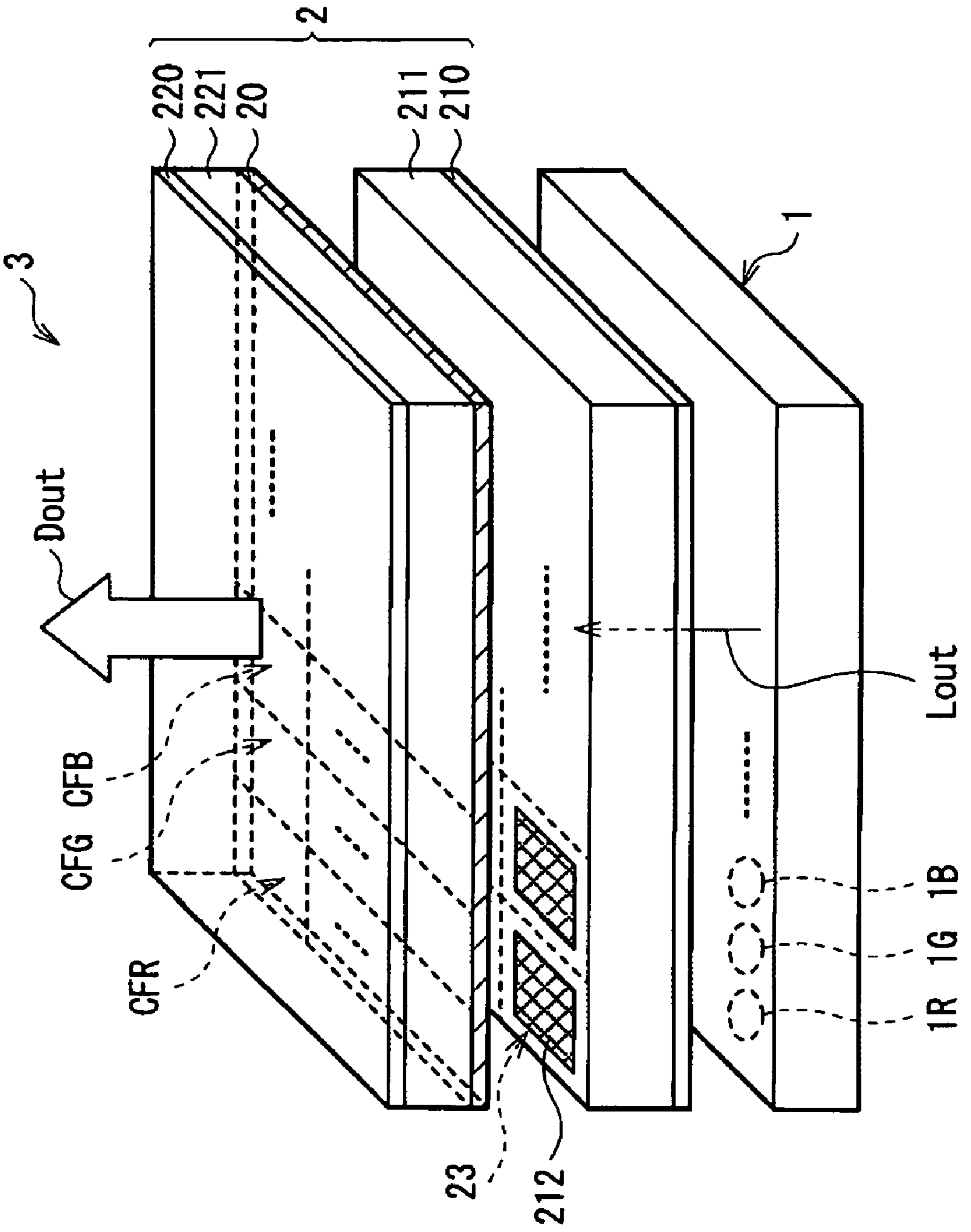
FIG. 1 is an exploded perspective view showing the entire configuration of a liquid crystal display according to an embodiment of the present invention.

FIG. 1 illustrates an entire configuration of a liquid crystal display (liquid crystal display 3) according to an embodiment of the present invention. The liquid crystal display 3 is what is called transmissive liquid crystal display that emits a transmitted light as the display light Dout, and configured to include a backlight system 1 and a transmissive liquid crystal display panel 2.

The liquid crystal display panel 2 is configured of a liquid crystal layer 20, a pair of substrates arranged with the liquid crystal layer 20 in between, namely, a TFT substrate 211 on the side of the backlight system 1 and a common electrode substrate 221 on the other side facing the TFT substrate 211, and polarizing plates 210 and 220 stacked on the TFT substrate 211 and the common electrode substrate 221 respectively on the side opposite to the liquid crystal layer 20.

In the TFT substrate 211, a plurality of pixels 23 are arranged in matrix as a whole, and a pixel electrode 212 is formed on the pixels 23 respectively.

Figure 2:
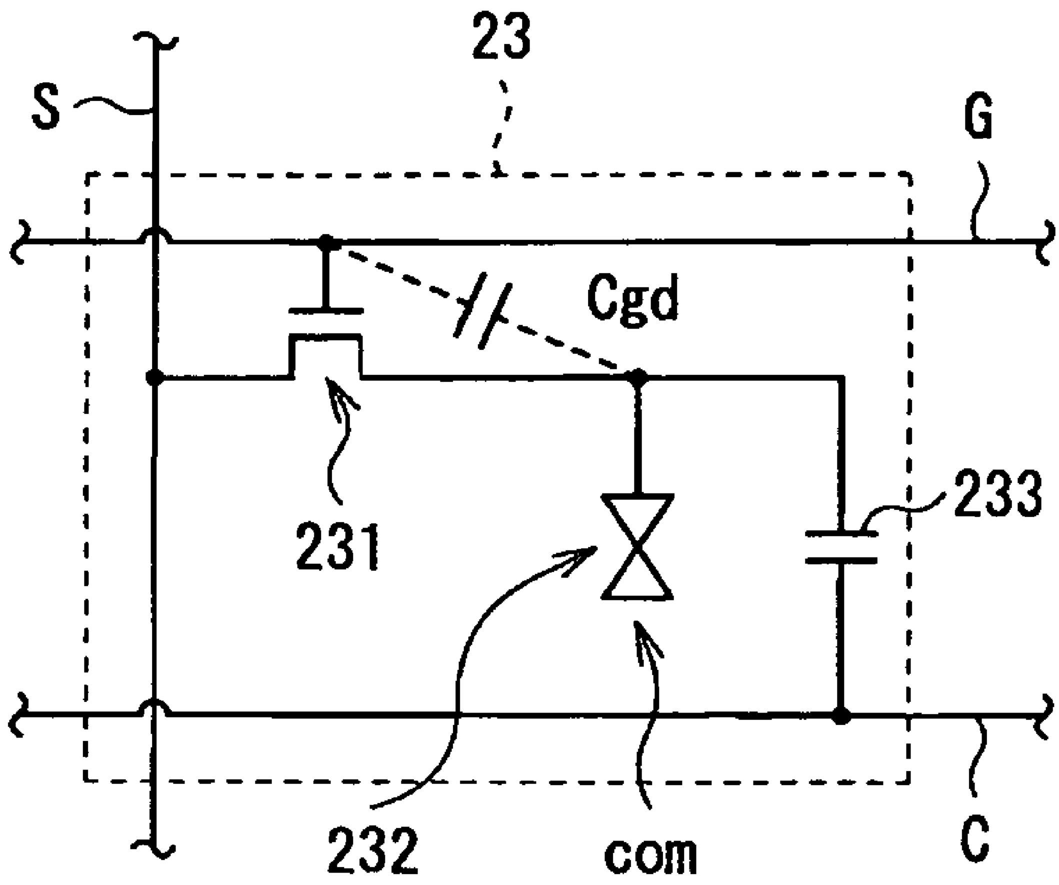
FIG. 2 is a circuit diagram showing an example of a pixel circuit disposed in each pixel appearing in FIG. 1.

Each of the pixels 23 includes a pixel circuit as shown in FIG. 2, for example. Specifically, each of the pixels 23 is connected to a source line S extending perpendicularly and a gate line G and a Cs line (auxiliary capacitance line) C extending horizontally in parallel with each other. The TFT element 231 is disposed on the intersection of these source line S and gate line G. The TFT element 231 has a function of applying a driving voltage from the source line S and the gate line G to a liquid crystal element 232 of the respective pixels 23, and configured using amorphous silicon (amorphous Si), for example. The gate of the TFT element 231 is connected to the gate line G, the drain thereof is connected to the one end of the liquid crystal element 232 (on the side of the pixel electrode 212), and the source is connected to the source line S. A storage capacitive element (auxiliary capacitive element) 233 is disposed between the Cs line C and the drain of the TFT element 231/the one end of the liquid crystal element. The other end of the liquid crystal element 232 (on the side of a common electrode com) and the Cs line C are electrically connected via a transfer electrode, electrically conductive grains, etc. that are not illustrated. In addition, as illustrated in FIG. 2, a parasitic capacitance Cgd is generated between the gate and drain of the TFT element 231 because of the overlapping of the gate line G, an amorphous silicon layer (not shown) and a drain electrode (not shown).

The backlight system 1 employs a color-mixing method in which an illumination light Lout of a specific color is obtained by mixing a plurality of colored lights (here, three primary colors of red, green and blue are employed). This backlight system 1 includes a light source (light source 10 to be mentioned hereinbelow) having two or more red LEDs 1R, two or more green LEDs 1G and two or more blue LEDs 1B respectively as the three kinds of light sources to emit lights of mutually different colors.

Figure 3A:
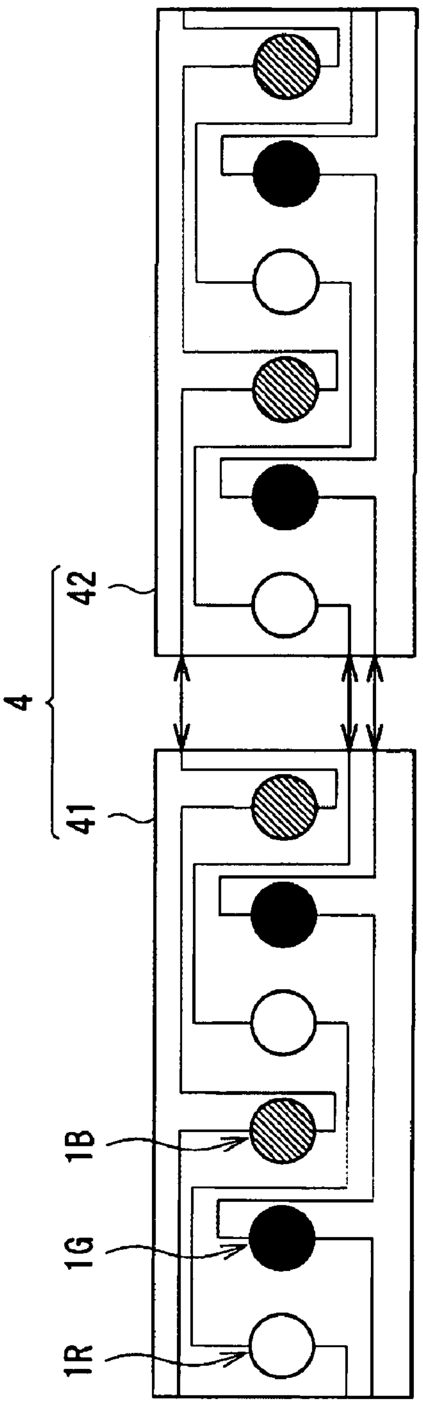
FIGS. 3A and 3B are planar pattern diagrams showing a configuration example of the unit (divided lighting section) of a light source in the backlight system appearing in FIG. 1.
Figure 3B:
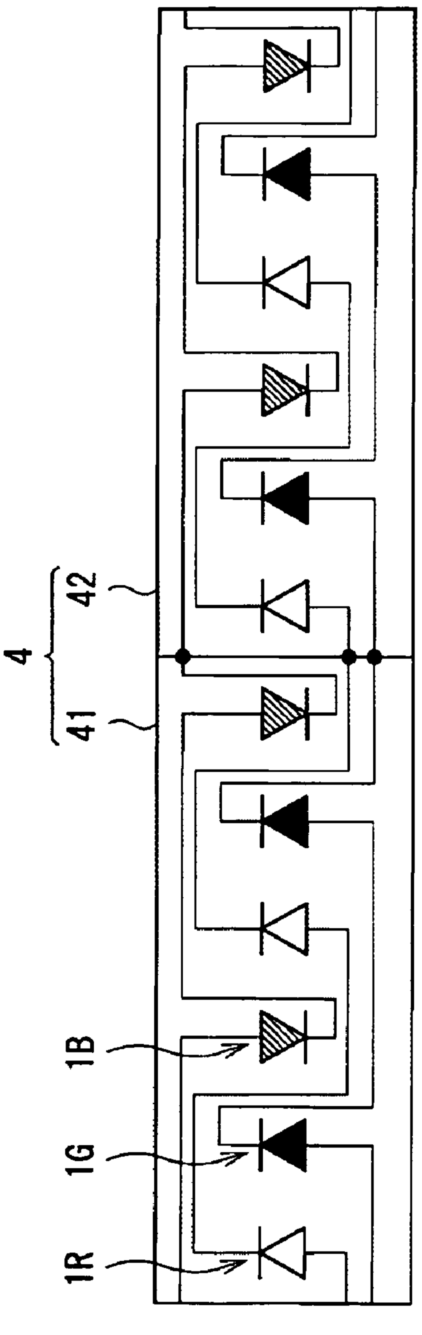
Figure 4:
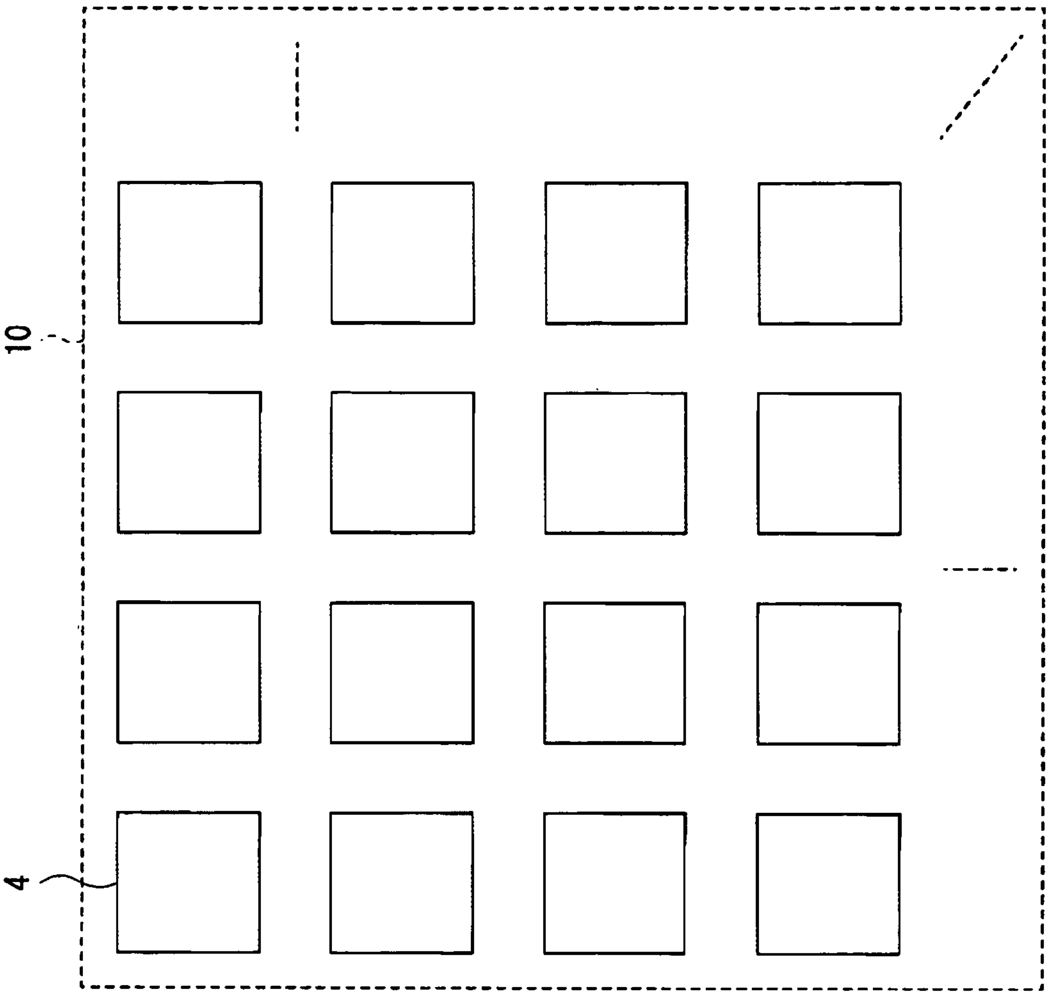
FIG. 4 is a planar pattern diagram showing an arrangement configuration example of the divided lighting section disposed in the light source appearing in FIG. 3.

FIGS. 3A, 3B and FIG. 4 illustrate an arrangement configuration example of the LEDs of respective colors provided in the backlight system 1.

As shown in FIG. 3A, the backlight system 1 is configured in such a manner that unit cells 41 and 42 of a light-emitting section include two pairs of red LEDs 1R, green LEDs 1G, and the blue LEDs 1B respectively, and these two unit cells 41 and 42 jointly constitute the one divided lighting section 4, which is a unit of light-emitting section. The LEDs of the same color are connected in series within the respective unit cells 41 and 42 and further between the unit cell 41 and the unit cell 42. Specifically, anodes and cathodes of the respective colors' LEDs are connected as shown in FIG. 3B.

The divided lighting sections 4 configured in such a manner are arranged in matrix in the light source 10 as shown in FIG. 4 for example, so as to be separately controlled as will be described hereinbelow.

Figure 5:
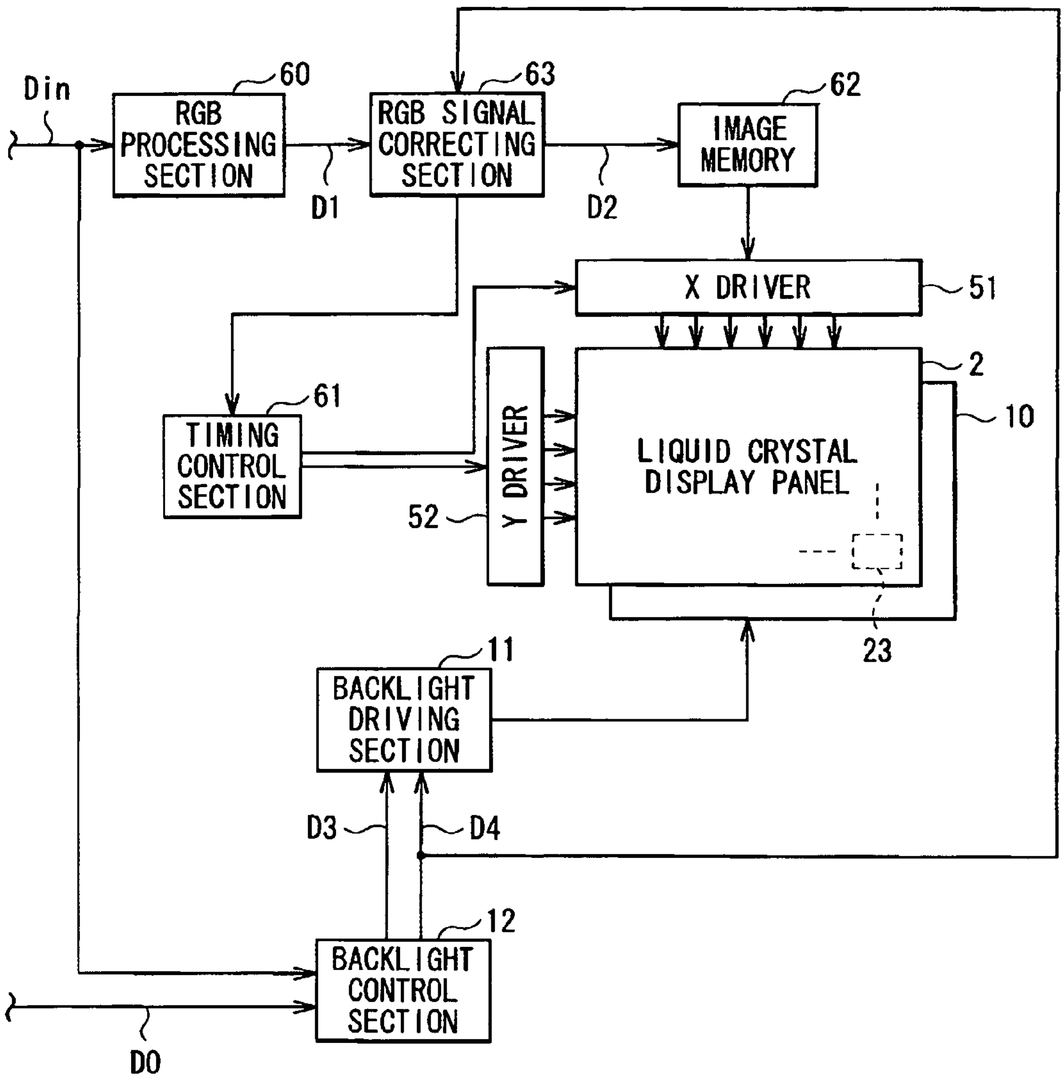
FIG. 5 is a block diagram showing the entire configuration of the liquid crystal display of FIG. 1.

Subsequently, configuration of the drive and control section of the above-mentioned liquid crystal display panel 2 and the light source 10 will be explained in detail with reference to FIG. 5. FIG. 5 is a block diagram showing the configuration of the liquid crystal display 3.

As shown in FIG. 5, a drive circuit for driving the liquid crystal display panel 2 to display an image is configured of an X driver (source driver) 51, a Y driver (gate driver) 52, a timing control section (timing generator) 61, an RGB processing section 60 (signal generator), an RGB signal correcting section 63 and an image memory 62.

The X driver (source driver) 51 supplies a driving voltage based on an video signal Din to individual pixel electrodes 212 disposed in the liquid crystal display panel 2 via the above-mentioned source line S. The Y driver (gate driver) 52 line-sequentially drives the individual pixel electrodes 212 disposed in the liquid crystal display panel 2 along the above-mentioned gate line G. The timing control section (timing generator) 61 controls the X driver 51 and the Y driver 52.

According to the present embodiment, the polarity inversion driving is conducted with such X driver 51, Y driver 52 and timing control section 61 by applying driving voltages with waveform of alternately-inverting polarity based on the video signal Din to the liquid crystal element 232 of the respective pixels 23, as will be described in detail hereinbelow.

The RGB processing section 60 (signal generator) processes the video signal Din transmitted from outside and generates an RGB signal. The image memory 62 is a frame memory that stores an RGB correction signal D2 supplied from the RGB signal correcting section 63.

The RGB signal correcting section 63 corrects the RGB signal D1 supplied from the RGB processing section 60 using a control signal D4 supplied from an after-mentioned backlight control section 12 and generates the RGB correction signal D2. The detailed operation of the RGB signal correcting section 63 will be described hereinbelow.

Meanwhile, the backlight driving section 11 and the backlight control section 12 constitute a driving/controlling section that drives and controls the light-emitting operation of the light source 10 disposed in the backlight system 1.

The backlight control section 12 generates and outputs control signals D3 and D4 to be described later based on the video signal Din supplied from outside and a control signal (total illumination adjusting signal) D0 supplied from outside so as to control the driving operation of the backlight driving section 11. The detailed configuration of the backlight control section 12 will be hereinbelow described (with reference to FIG. 6).

Figure 6:
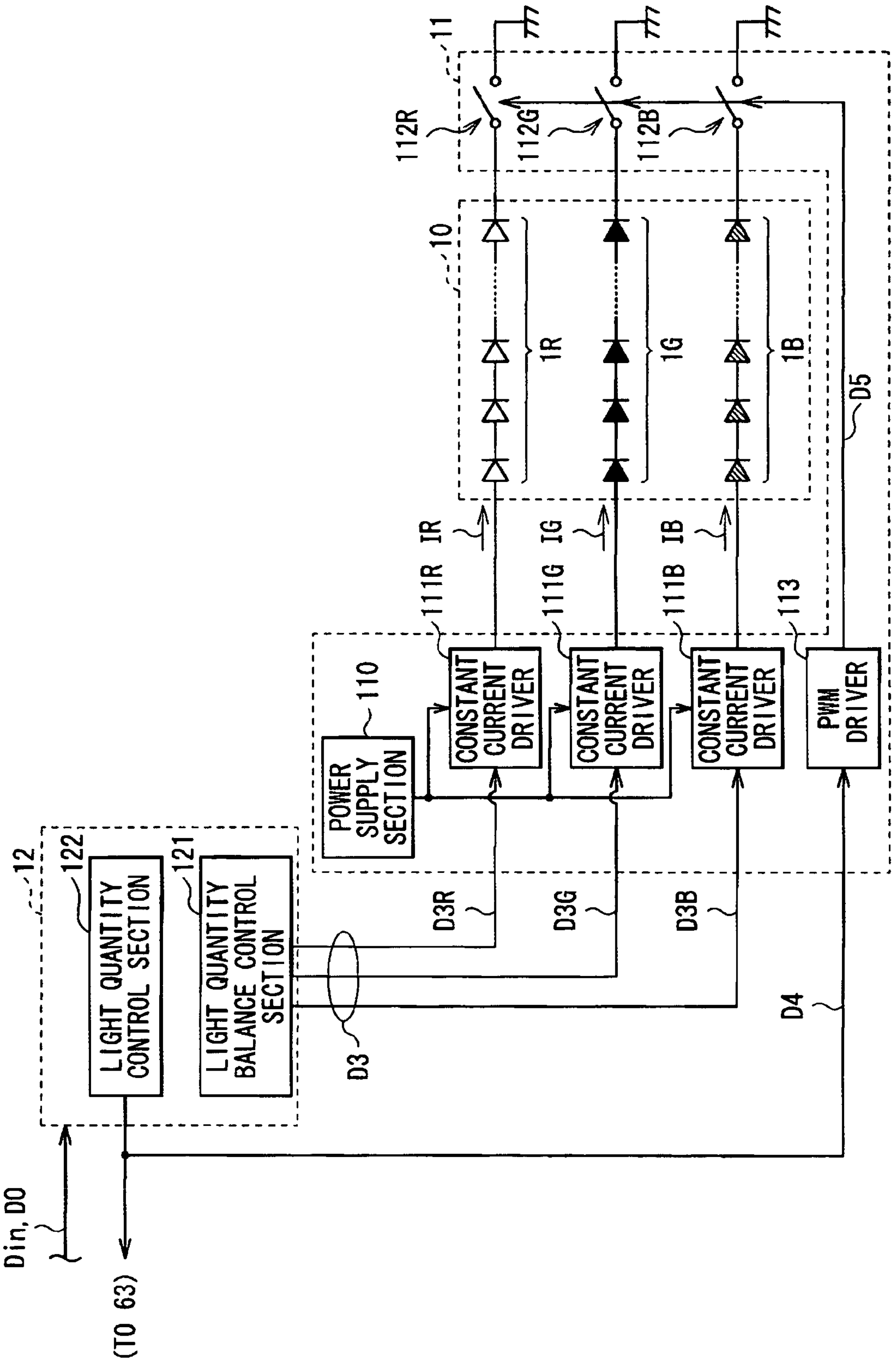
FIG. 6 is a block diagram showing the detailed configuration of a driving section and a controlling section of the light source appearing in FIG. 5.

The backlight driving section 11 drives the light source 10 in a time-division way so that the light emitting operation of each divided lighting section 4 is implemented independent of each other based on the control signals D3 and D4 supplied from the backlight control section 12. The detailed configuration of the backlight driving section will be hereinbelow described, too (FIG. 6).

Subsequently, detailed configuration of the above-mentioned backlight driving section 11 and the backlight control section 12 will be hereinafter described with reference to FIG. 6. FIG. 6 is a block diagram showing the detailed configuration of the backlight driving section 11 and the backlight control section 12, and the configuration of the light source 10. It is to be noted that the control signal D3 is configured of a control signal D3R for red, a control signal D3G for green, and a control signal D3B for blue, and the control signal D4 is configured of a control signal D4R for red, a control signal D4G for green, and a control signal D4B for blue. Here, for convenience, all the red LEDs 1R are connected in series, all the green LEDs 1G are connected in series and all the blue LEDs 1B are connected in series within the light source 10.

The backlight driving section 11 includes a power supply section 110, constant current drivers 111R, 111G and 111B, switching elements 112R, 112G and 112B, and a PWM driver 113.

The constant current drivers 111R, 111G, and 111B, with the power from the power supply section 110, supply electric currents IR, IG and IB to respective anodes of the red LED 1R, the green LED 1G and the blue LED 1B disposed in the light source 10 in accordance with the control signal D3 (the control signal D3R for red, the control signal D3G for green, and the control signal D3B for blue) supplied from the backlight control section 12.

The switching elements 112R, 112G and 112B are connected between the grounds and the cathodes of the red LED 1R, green LED 1G and the blue LED 1B respectively. Here, the switching elements 112R, 112G and 112B are formed by a transistor or the like such as MOS-FET (metal oxide semiconductor-field emission transistor), etc., for example.

The PWM driver 113 generates and outputs a control signal D5 (pulse signal) for the switching elements 112R, 112G and 112B based on the control signal D4 supplied from the backlight control section 12 and controls the switching elements 112R, 112G and 112B with the PWM control method.

The backlight control section 12 includes a light quantity balance control section 121 and a light quantity control section 122.

The light quantity balance control section 121 generates and outputs the control signal D3 (the control signal D3R for red, the control signal D3G for green, and the control signal D3B for blue) based on the video signal Din and the control signal D0 for the constant current drivers 111R, 111G and 111B respectively. With such configuration, electric current (light emission currents) IR, IG and IB passing through the red LED 1R, green LED 1G and the blue LED 1B are corrected respectively based on the color temperatures to change the light quantity so that the color balance (color temperature) of the illumination light Lout from the light source 10 is controlled in accordance with predetermined values.

The light quantity control section 122 generates and outputs the control signal D4 to be transmitted to the PWM driver 113 based on the video signal Din and the control signal D0. In this manner, light emitting periods (illuminating periods) of the red LED 1R, green LED 1G and blue LED 1B are changed respectively and the light quantity (luminescent brightness) of the illumination light Lout from the light source 10 is controlled.

Here, the backlight system 1 corresponds to a specific example of the "light source unit" according to an embodiment of the present invention. The backlight control section 12 corresponds to a specific example of the "light source control section" according to an embodiment of the present invention. The RGB signal correcting section 63, the image memory 62, the timing control section 61, the X driver 51 and the Y driver 52 correspond to a specific example of the "display driving section" according to an embodiment of the present invention.

Subsequently, operation and effects of the liquid crystal display 3 according to the present embodiment will be hereinafter described.

Figure 7:
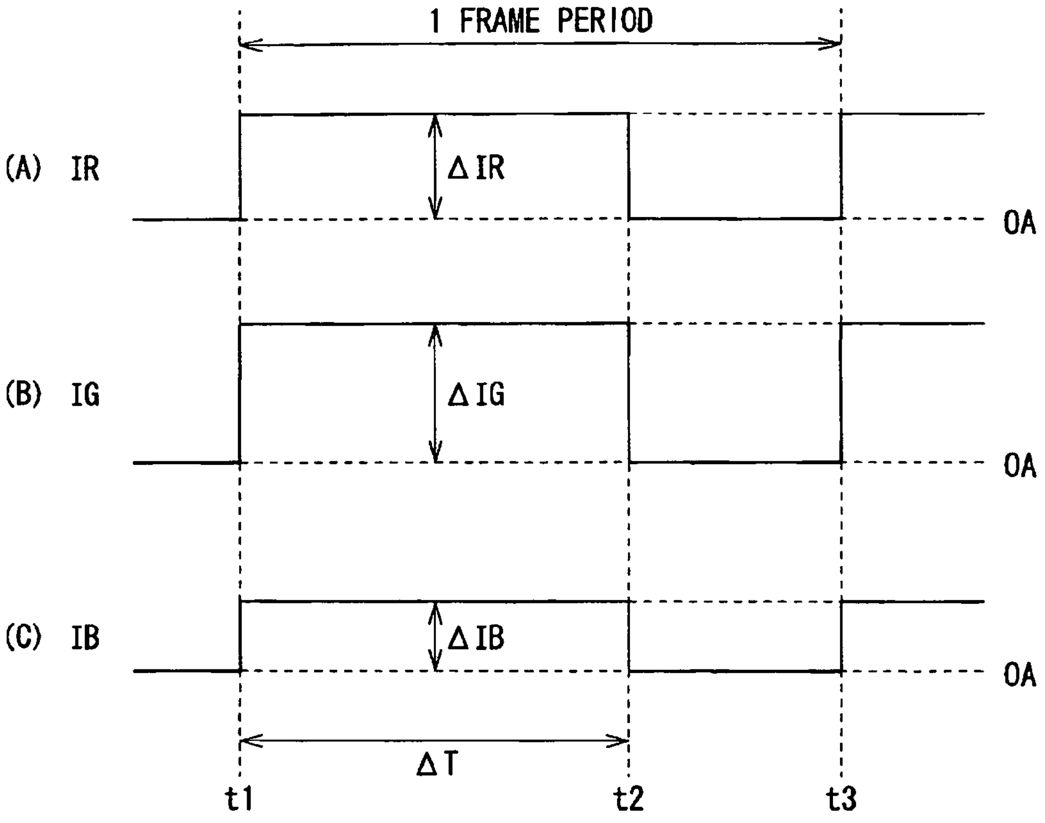
FIG. 7 is a timing waveform to explain a driving pulse signal of the light source.
Figure 8:
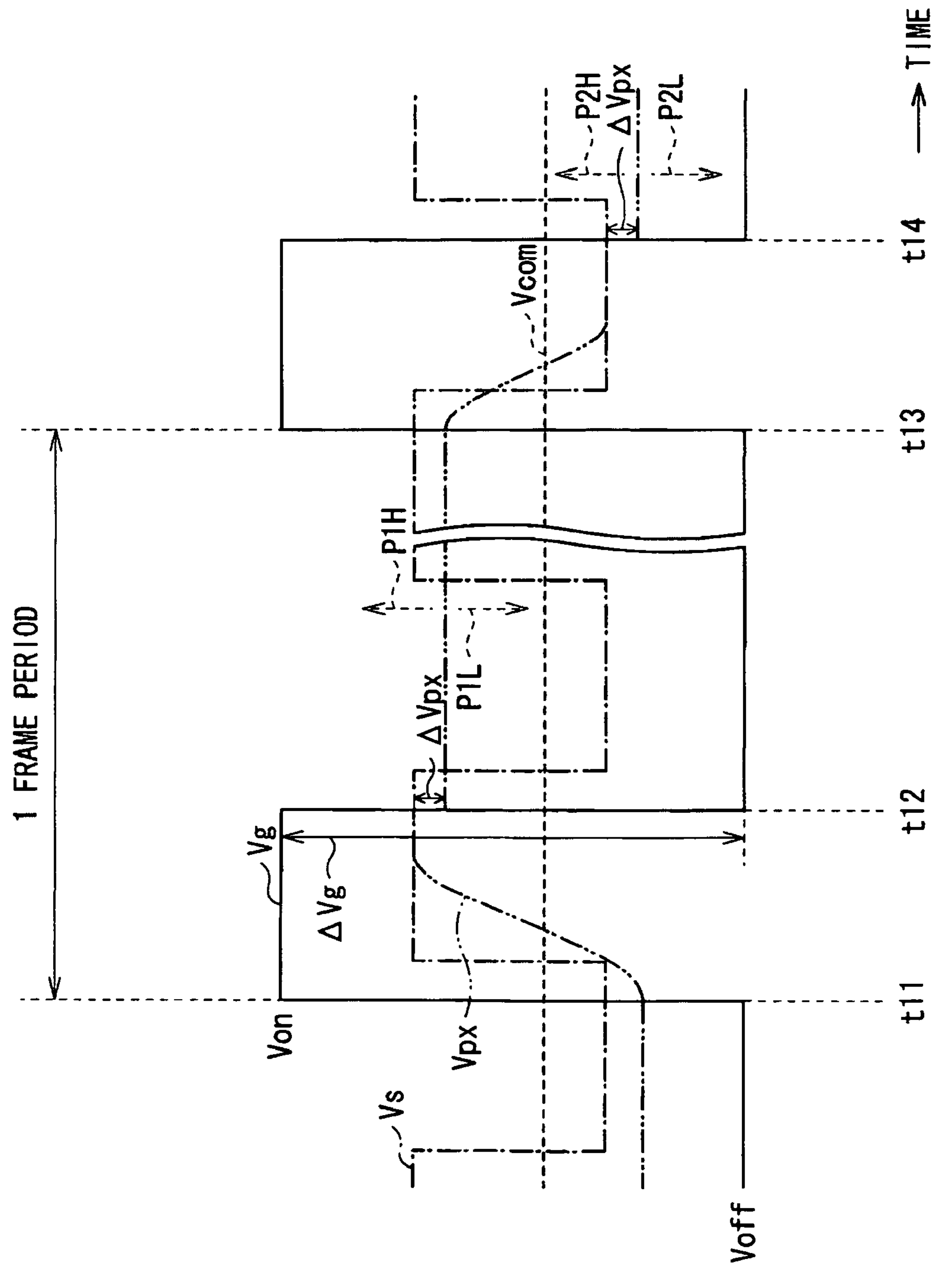
FIG. 8 is a timing waveform to explain an example of a way of driving the liquid crystal display panel appearing in FIG. 1.

First, fundamental operation of the liquid crystal display 3 will be hereinbelow described with reference to FIGS. 1 to 9. FIG. 7 is a timing waveform illustrating the light emitting operation of the light source 10 provided in the backlight system 1, where (A) represents the electric current (light emission current) IR passing through the red LED 1R, (B) represents the electric current IG passing through the green LED 1G and (C) represents the electric current IB passing through the blue LED 1B respectively. FIG. 8 is a timing waveform schematically showing the entire operation of the liquid crystal display 3. In this figure, Vcom denotes a potential of the common electrode, Vs denotes the video signal voltage (potential of the source line S), Vg denotes the gate scan voltage (potential of the gate line G), ΔVg denotes a variation of the gate voltage, Vpx denotes a pixel voltage (holding potential held in the liquid crystal element 232), ΔVpx denotes a variation of the pixel voltage, Von denotes a gate-on voltage, and Voff denotes a gate-off voltage respectively.

In the backlight system 1, when the switching elements 112R, 112G and 112B disposed in the backlight driving section 11 come into the ON state, the electric currents (light emission currents) IR, IG and IB flow from the constant current drivers 111R, 111G and 111B into the red LED 1R, the green LED 1G and the blue LED 1B of the light source 10 respectively based on the electric power supply from the power supply section 110, and red, green and blue lights are emitted to make the illumination light Lout as the mixed color light.

At that time, since the control signal D0 is supplied to the backlight driving section 11 from outside and the control signal D5 based on this control signal D0 is supplied to the respective switching elements 112R, 112G and 112B from the PWM driver 113 disposed in the backlight driving section 11, the switching elements 112R, 112G and 112B come into the ON state in accordance with the timing of the control signal D0, and the light emitting periods of the red LED 1R, green LED 1G and the blue LED 1B are also synchronized with the timing. In other words, the PWM driving of the red LED 1R, green LED 1G and blue LED 1B is carried out by means of the time division driving using the control signal D5 as a pulse signal.

In the backlight control section 12, the control signals D3R, D3G and D3B are supplied to the constant current drivers 111R, 111G and 111B from the light quantity balance control section 121 respectively so that the magnitude of the electric currents IR, IG and IB, (i.e., ΔIR, ΔIG and ΔIB), other words, the light quantity of the LEDs 1R, 1G and 1B is corrected to keep the chromaticity (color temperature, color balance) of the illumination light Lout constant (with reference to (A) to (C) of FIG. 7).

In the light quantity control section 122, the control signal D4 is generated and supplied to the PWM driver 113 so that the period during which the switching elements 112R, 112G, and 112B are in the ON state, i.e., the light emitting period ΔT of the respective LEDs 1R, 1G and 1B is adjusted (with reference to (A) to (C) of FIG. 7).

In this manner, the magnitude of the electric currents IR, IG and IB (ΔIR, ΔIG and ΔIB) (the light quantity of the LEDs 1R, 1G and 1B) and the light emitting period ΔT are controlled, and the light quantity (luminescent brightness) of the illumination light Lout is controlled, separately for each of divided lighting sections 4.

Meanwhile, in the liquid crystal display 3 as a whole, the driving voltage (voltage applied to pixels) for the pixel electrode 212, which is outputted from the X driver 51 and the Y driver 52 based on the video signal Din, modulates the illumination light Lout emitted from the light source 10 of the backlight system 1 in the liquid crystal layer 20, and the modulated light is then outputted from the liquid crystal display panel 2 as the display light Dout. In this manner, the backlight system 1 functions as the backlight of the liquid crystal display 3 and the display light Dout allows images to be displayed.

Specifically, in each pixel 23 arranged in the liquid crystal display panel 2, polarity inversion driving is applied to the liquid crystal element 232 of each pixel 23, as shown in FIG. 8 for example. Namely, at first, at the timing t11, when the gate scan voltage Vg reaches the gate-on voltage Von, the TFT element 231 comes into the ON state and the video signal voltage Vs is written into the liquid crystal element 232 via the channel of the TFT element 231. In this manner, the capacitance of the liquid crystal element 232 (liquid crystal capacitance Clc) and the capacitance of the storage capacitive element 233 (storage capacitance Cs) are charged and the pixel voltage Vpx reaches the video signal voltage Vs. Subsequently, when the gate scan voltage Vg goes down to the gate-off voltage Voff at the timing t12, the channel of the TFT element 231 is shut down and the pixel voltage Vpx charged in the liquid crystal capacitance Clc and the storage capacitance Cs is held therein until the next gate on voltage comes (the period to the timing t13). It is to be noted that the operation in the period from the timing t13 to t14 (operation at the time of negative polarity driving) is the same as the operation in the period from the timing t11 to t12 (operation at the time of positive polarity driving) except that the polarity of the pixel voltage Vpx is inverted.

Figure 9:
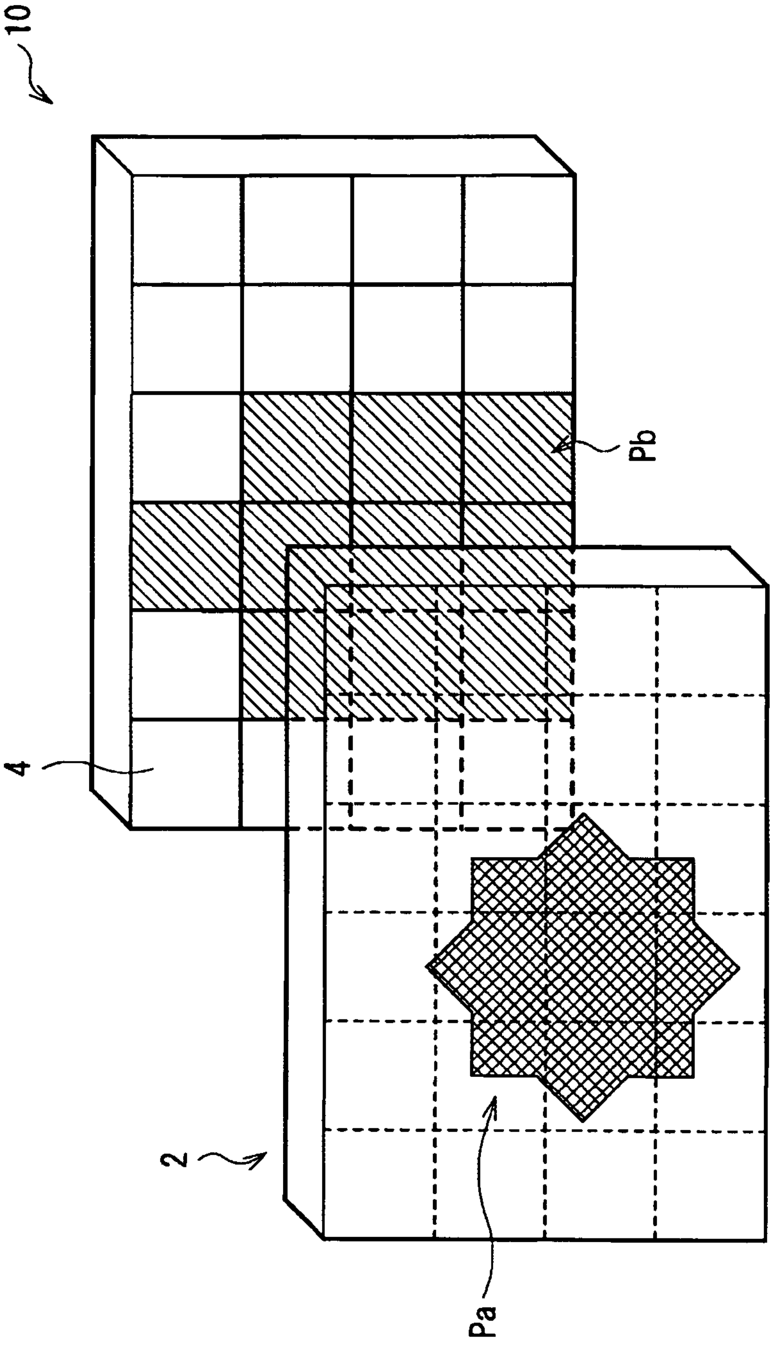
FIG. 9 is a perspective view to explain an example of mutual positional relationship between an image display area and a partial light-emitting area.

In addition, in the light source 10 of the liquid crystal display 3, only a portion of the divided lighting sections 4 corresponding to a portion of the image display area of the liquid crystal display panel 2 having a predetermined luminance level or more (the area where a display image Pa is displayed) among the entire image display area, emits light, and a partial light-emitting area Pb is formed as shown in FIG. 9, for example. Namely, the light quantity may be adjusted separately for each of the plurality of divided display regions of the liquid crystal display panel (display area corresponding to the divided lighting section 4) in accordance with the video signal Din by separately controlling the light quantity for each of the plurality of divided lighting sections 4 to be separately controlled. Specifically, in the case of a dark image scene for example, deterioration of black level is suppressed and the image contrast is enhanced by reducing the intensity of the illumination light Lout emitted from the backlight system 1 compared with a bright image scene. On the other hand, in the case of a dazzlingly bright image scene for example, clearness of image is enhanced by temporarily increasing the intensity of the illumination light Lout emitted from the backlight system 1 compared with the scene of usual brightness.

Figure 10:
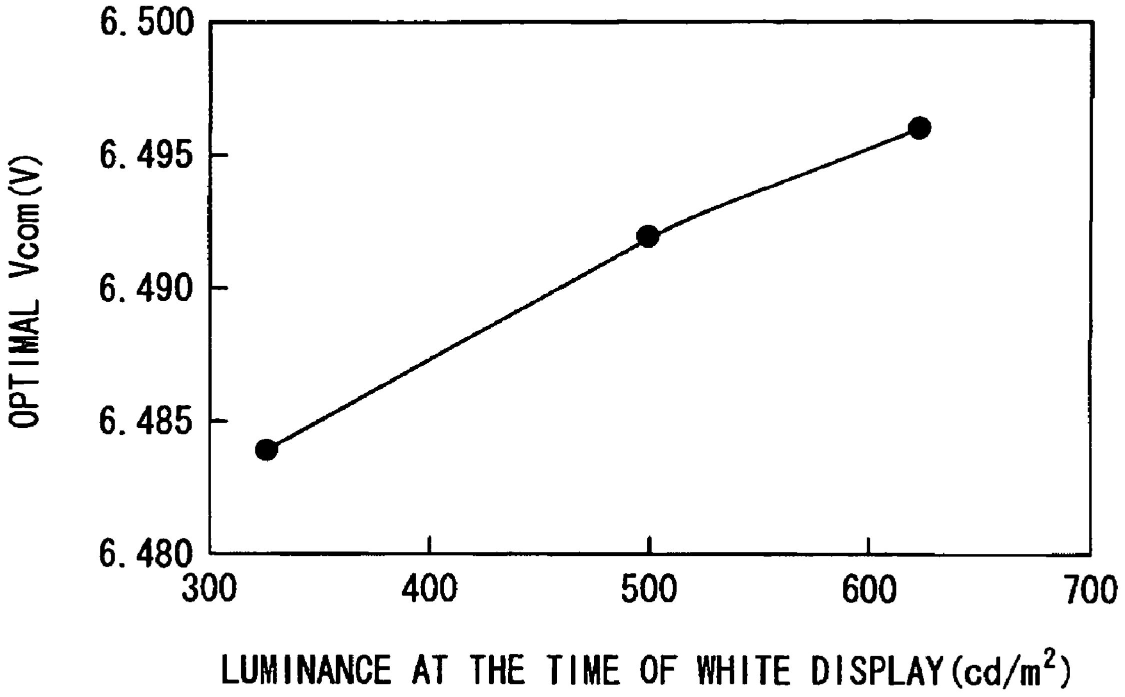
FIG. 10 is a characteristic chart showing an example of a relationship of the optimal common electrode potential and the luminance at the time of white display (luminance of the irradiation light from the backlight system).

Subsequently, the control operation of characteristic portions according to an embodiment of the present invention will be hereinbelow described with reference to FIGS. 10 and 11 in addition to FIGS. 1 to 9.

First, the common electrode potential Vcom indicated in FIG. 8 is adjusted to an optimal value of voltage in the final step of the manufacturing process of a liquid crystal module so as to reduce the occurrence of the image persistence and flickers to the minimum. This is because if the common electrode potential Vcom is not appropriately adjusted, the relationship of positive portion and negative portion of the voltage amplitude is out of balance so that the deviated quantity of a direct current voltage continues to be applied to the liquid crystal, which may cause the burn-in and so on after a longtime operation.

However, when the intensity of the illumination light Lout from the backlight system 1 is higher or lower than the ordinary illumination intensity, the common electrode potential Vcom is deviated from such appropriately adjusted voltage.

Such phenomenon is due to the following reasons. Namely, when the gate scan voltage Vg turns from the gate-on voltage Von to the gate-off voltage Voff, the pixel voltage Vpx is varied under the influence of the gate voltage variation ΔVg via the parasitic capacitance Cgd. Specifically, variation ΔVpx of the pixel voltage Vpx is given by the expression (1) as shown hereinafter (with reference to FIG. 8). Such phenomenon is called feed through.

[Expression 1]

$$\Delta Vpx = \frac{Cgd}{Clc + Cs + Cgd} \times \Delta Vg \tag{1}$$

To prevent such phenomenon, the common electrode potential Vcom is optimally adjusted to the amplitude center potential between the positive level and negative level of the pixel voltage Vpx rather than the amplitude center voltage of the video signal voltage Vs, as shown in FIG. 8. Such optimal adjustment of the common electrode potential Vcom allows the charged voltages in the liquid crystal capacitance Clc and the storage capacitance Cs to be almost balanced between the positive period and negative period of the pixel voltage Vpx. Accordingly, issues such as flickers due to the polarity inversion driving, image persistence caused by continuously applying an offset voltage of either polarity to the liquid crystal element 232 and so on are prevented.

Here, when the channel portion of amorphous Si in the liquid crystal display panel 2 including the TFT element 231 made of an amorphous silicon (amorphous Si) is irradiated with light, optically-induced electromotive force is generated and dielectric constant is changed. At this time, since the parasitic capacitance Cgd is made of an amorphous silicon layer, the parasitic capacitance Cgd increases/decreases in accordance with the intensity fluctuation of the illumination light Lout emitted from the backlight system 1.

By the way, it is to be noted that the variation of the pixel voltage ΔVpx is expressed with the above-mentioned expression (1), and is proportional to the variation of the gate voltage ΔVg via the coefficient made of a capacitance ratio. At this time, when the parasitic capacitance Cgd and the pixel voltage variation at this time are defined as Cgd' and ΔVpx' respectively, the following relational expression (2) is obtained:

[Expression 2]

$$\Delta Vpx' = \frac{Cgd'}{Clc + Cs + Cgd'} \times \Delta Vg \tag{2}$$

The expression (2) indicates that if the backlight luminance increases, the parasitic capacitance Cgd decreases (Cgd'<Cgd) and the variation of the pixel voltage decreases (ΔVpx'<<ΔVpx) since the liquid crystal capacitance Clc and the storage capacitance Cs are large enough compared with the parasitic capacitance Cgd. Accordingly, both the positive and negative voltage of the pixel voltage Vpx increases by the value of (ΔVpx minus ΔVpx') respectively, therefore it may be necessary to correct the amplitude center between the positive level and the negative level of the pixel voltage Vpx to conform to the common electrode potential Vcom.

Accordingly, in the present embodiment, the RGB signal correcting section 63 corrects the RGB signal D1 separately for each of divided display regions of the liquid crystal display panel 2 corresponding to the ON-state divided lighting section 4 so that the amplitude center potential of the driving voltage with a waveform of alternately-inverting polarity substantially agrees with the predetermined common electrode potential Vcom without depending on the light quantity of the divided lighting section 4. At this time, correction of the RGB signal D1 is conducted using the control signal D4 supplied from the backlight control section 12 to separately control the light quantity of each divided lighting section 4. Then, a driving voltage corresponding to the corrected RGB correction signal D2 is applied to the liquid crystal element 232.

Specifically, in the case of increasing the backlight luminance in a certain divided display region, for example, the amplitude center voltage of the RGB signal D1 corresponding to the portion is corrected to a lower position and in the case of decreasing the backlight luminance, the amplitude center voltage thereof is corrected to a higher position. Namely, correction of the RGB signal D1 is conducted so that the absolute value of the positive driving voltage may be decreased and the absolute value of the negative driving voltage may be increased as the light quantity of each divided lighting section 4 increases (with reference to arrows P1L and P2L of FIG. 8). Meanwhile, correction of the RGB signal D1 is conducted so that the absolute value of the positive driving voltage may be increased and the absolute value of the negative driving voltage may be decreased as the light quantity of each divided lighting section 4 decreases (with reference to arrows P1H and P2H of FIG. 8).

Figure 11:
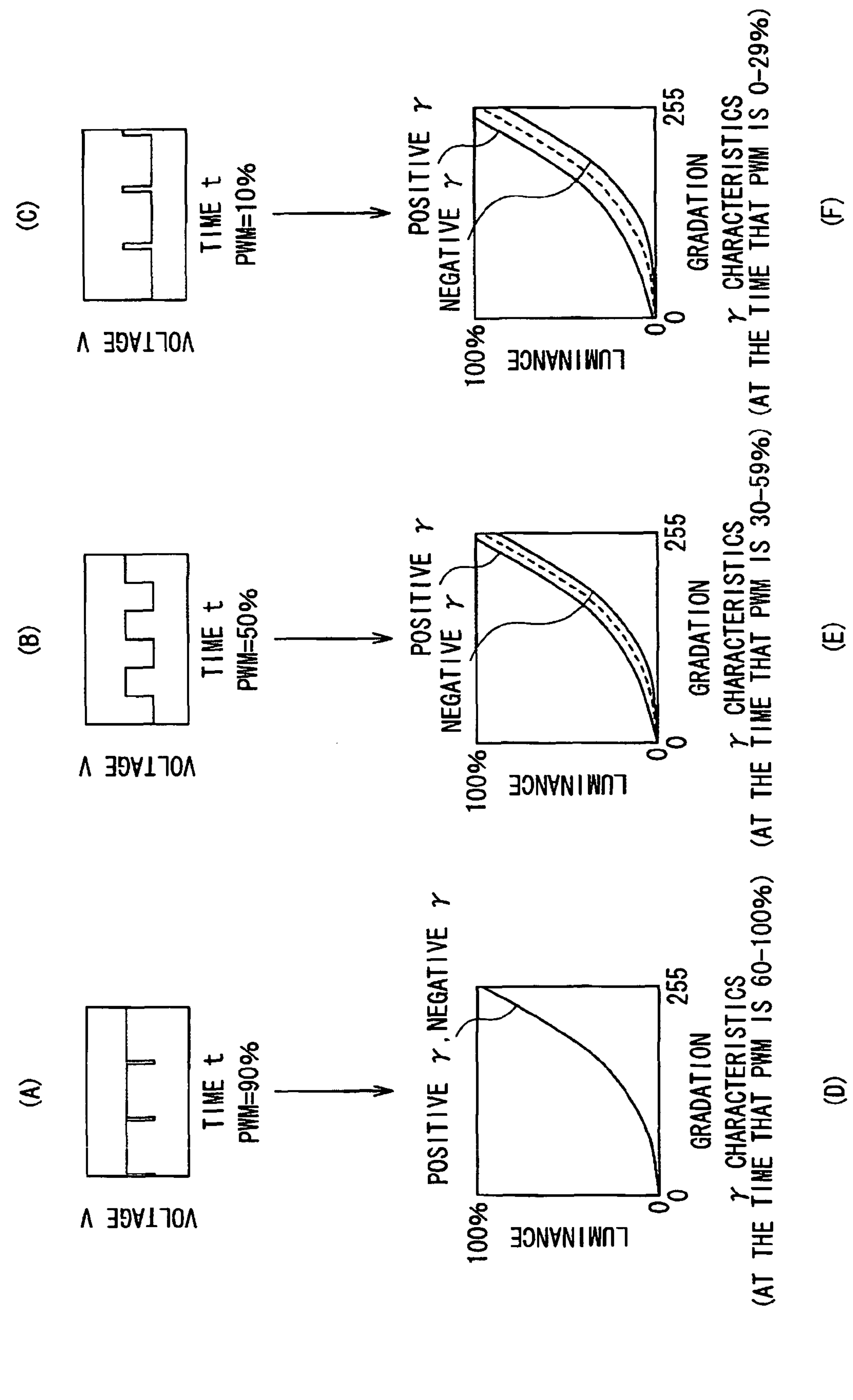
FIG. 11 is a figure to explain an example of a way of correcting a video signal executed by a RGB correcting section shown in FIG. 5.

More specifically, correction of the RGB signal D1 is conducted as shown in (A) to (F) of FIG. 11, for example. Namely, gradation look-up tables (LUT) are prepared in advance and referred to in correcting the amplitude center voltage of the RGB signal D1. The LUT is configured of a first table for positive polarity and second table for negative polarity having different reference values from those of the first table, where a logarithm assumed as the variation of backlight luminance is used. If correction is conducted based on six kinds of backlight luminance ranges with respect to high luminance, medium luminance and low luminance in accordance with the stages of the duty ratio of PWM or the intensity of backlight luminance, for example, four LUTs in addition to the high luminance LUT for the initial state are prepared in advance.

Initially, when the Vcom voltage of the liquid crystal display panel 2 is adjusted with the LUT of high luminance range equivalent to 100 percent duty ratio of PWM, the Vcom voltage is most optimally adjusted to the amplitude center voltage of the RGB signal D1.

Then, the duty ratio of PWM is lowered in accordance with the RGB signal D1 and when the backlight luminance is determined to be that of the medium range, correction of gradation voltage is conducted both for the positive and negative polarities using one pair of the medium luminance LUTs. As a result, the positive gradation voltage is decreased while the negative gradation voltage is increased so that the amplitude center voltage of the RGB signal D1 may be lowered.

When the duty ratio of PWM is further lowered in accordance with the video signal, correction of gradation voltage is conducted both for the positive and negative polarities using one pair of the low luminance LUTs to further enlarge the voltage difference.

The timing and frequency of the correction may be determined by, for example, starting timer-counting at the starting time of the operation of the liquid crystal display 3 and referring to a PWM signal periodically at an interval of, for example, ten to sixty minutes. In this manner, selection of optimal LUT may be made based on the referred duty ratio of PWM so that correction may be conducted thereupon. What is more, correction may be conducted not only periodically but also when, for example, the video input source of the liquid crystal display 3 is changed or when a channel of the liquid crystal display 3, which is a television, is switched.

Thus according to the present embodiment, correction of the RGB signal D1 is performed separately for each of divided display regions of the liquid crystal display panel 2 corresponding to the ON-state divided lighting sections 4 so that the amplitude center potential of the driving voltage with a waveform of alternately-inverting polarity substantially agrees with the predetermined common electrode potential Vcom without depending on the light quantity of the divided lighting section 4, then a driving voltage corresponding to the corrected RGB correction signal D2 is applied to the liquid crystal element 232. In this manner, fluctuation of the amplitude center potential due to the variation of the light quantity of each divided lighting section 4 is suppressed, and occurrence of image persistence of the liquid crystal, flickers and an unevenness in display, etc. caused by the electric potential difference of the amplitude center potential and the common electrode potential Vcom can be suppressed.

As mentioned above, according to the present embodiment, since the light quantity for each of the plurality of divided lighting sections 4 to be separately controlled, is controlled, the light quantity is separately controlled for each of the divided display regions of an LCD panel, in accordance with the inputted video signal Din. As a result, sharpness in the image contrast may be improved. In addition, since the RGB signal D1 is corrected separately for each of divided display regions of the liquid crystal display panel so that the amplitude center potential of the driving voltage with a waveform of alternately-inverting polarity substantially agrees with the predetermined common electrode potential Vcom without depending on the light quantity of the divided lighting section 4, occurrence of image persistence of liquid crystal, flickers and unevenness in display, etc. due to the electric potential difference of the amplitude center potential and the common electrode potential Vcom may be suppressed. As a result, sharpness of image contrast may be improved while suppressing the image quality deterioration.

The present invention has been described with reference to the embodiments as mentioned above, but it is not limited to the above-mentioned embodiments and various modifications are obtainable.

Figure 12:
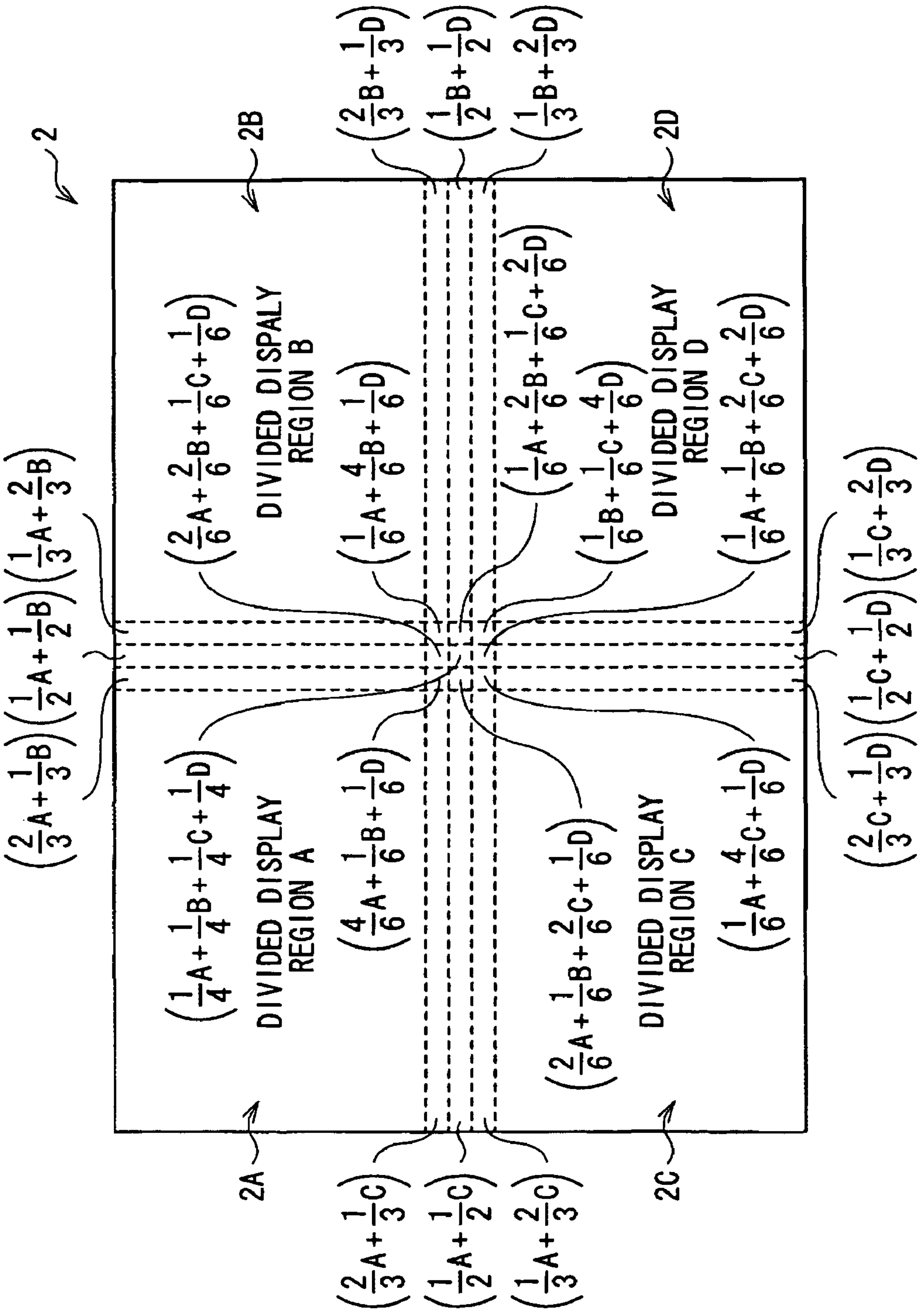
FIG. 12 is a planar pattern diagram to explain the way of correcting the video signal according to a modification of the present invention.

For example, according to the above mentioned embodiment, description is made as to the case in which the location and individual size is similar between the corresponding divided lighting section 4 of the backlight system 1 and divided display region of the liquid crystal display panel 2. In practice, however, a medium luminance zone is generated in a boundary zone between one divided lighting section 4 and a neighboring divided lighting section 4 in the backlight system 1 due to the two neighboring divided lighting sections 4. Accordingly, in order to suitably correct a data signal voltage of the liquid crystal display panel 2 according to the medium luminance zone, it may be necessary to provide another divided display region on the liquid crystal display panel 2 that corresponds to the boundary zone, and to correct the data signal voltage to an intermediate value of the surrounding divided display regions. Specifically, for example, in the boundary zones of the respective divided display regions 2A to 2D as shown in FIG. 12, correction of the RGB signal D1 is conducted in accordance with the weighted sum of the light quantity obtained from carrying out the weighted addition on the light quantity of the corresponding divided lighting sections 4 based on distance (by varying the weighting factor with distance). Namely, three or more gradual transition regions are provided in the boundary zones with respect to the surrounding divided display regions, and a correction signal is calculated suitably in proportion to the distance from the surrounding divided display regions.

Further, since the boundary zone between one divided display region and its neighboring divided display region is varied discontinuously, it may look like a streaky unevenness on screen when the correction voltage difference between the two divided display regions is large to a certain degree. To avoid such phenomenon, it is desirable that the boundary of the two adjoining divided display regions has a complicated zigzag shape like a joint between pieces of a jigsaw puzzle, and the zigzag shape is minute enough to be comparable to the level of a high spacial resolution so that streaky unevenness of the boundary zone may be prevented.

In addition, according to the above-mentioned embodiment, although description is made as to the case in which the luminance and color temperature of the light source are controlled by changing at least one of the light-emitting period and the light quantity of LEDs, one or both of the luminance and the color temperature of the light source may be controlled by changing one or both of the light-emitting period and the light quantity of LEDs, for example.

In addition, according to the above-mentioned embodiment, although description is made as to the case in which the red LED 1R and the green LED 1G and the blue LED 1B are housed in different packages respectively, they may be housed into one package all together, for example.

In addition, according to the above-mentioned embodiment, although description is made as to the case in which the light source 10 is configured of the red LED 1R, green LED 1G and the blue LED 1B, it may be configured to include another color-LED that emits a color other than red, green and blue in addition thereto (or instead of red, green and blue).

When four or more colors are employed, the color gamut is expanded so that variation of wider color expression is available.

In addition, according to the present embodiment, although description is made as to the case in which the light source 10 is configured to include LEDs, it may be configured to include other light-emitting devices such as an EL element, laser device and so on, for example.

Further, according to the above-mentioned embodiment, although description is made as to the case in which the liquid crystal display 3 is a transmissive liquid crystal display configured to include the backlight system 1, it may be a reflective liquid crystal display configured to include a front light system according to the embodiment of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display comprising:

a light source unit including a light source having a plurality of divided lighting sections to be separately controlled and a light source control section controlling a light quantity of each of the divided lighting sections by a light control signal;

a liquid crystal display panel including a plurality of pixels each having a liquid crystal element, a pixel electrode and a common electrode, and modulating light emitted from the light source based on an inputted video signal; and a display driving section performing a polarity inversion driving by applying driving voltages with waveform of alternately-inverting polarity based on the inputted video signal to the pixel electrode of each of the pixels, while maintaining the common electrode at a common potential, wherein the display driving section corrects the inputted video signal, separately for each of divided display regions in the liquid crystal display panel corresponding to ON-state divided lighting sections, based on the light control signal from the light source control section, so that a amplitude center potential of the driving voltage with a waveform of alternately-inverting polarity substantially agrees with the common potential, irrespective of the light quantity of the divided lighting section, and then the display driving section applies a driving voltage based on a corrected video signal to the liquid crystal element.

2. The liquid crystal display according to claim 1, wherein the display driving section corrects the inputted video signal so that;

the absolute value of positive level in the driving voltage decreases while the absolute value of negative level in the driving voltage increases, as the light quantity of the divided lighting section increases; and the absolute value of positive level in the driving voltage increases while the absolute value of negative level in the driving voltage decreased, as the light quantity of the divided lighting section decreases.

3. The liquid crystal display according to claim 1, wherein the light source control section controls the light quantity of each of the divided lighting section through changing length of lighting duration thereof by the light control signal; and the display driving section corrects the inputted video signal through utilizing the light control signal from the light source control section.

4. The liquid crystal display according to claim 1, wherein for a boundary display zone which is a zone in vicinity of a boundary between the divided display regions, the display driving section performs an operation of weighted addition with use of light quantity values in divided lighting sections in vicinity of the boundary and weighting factors depending on locations in the boundary display zone, thereby to correct the inputted video signal according to a light quantity obtained through the operation of weighted addition.

5. The liquid crystal display according to claim 1, wherein the liquid crystal display panel includes TFT elements each applying the driving voltage to the liquid crystal element in each of the pixels, the TFT elements being formed of amorphous silicon.

* * * * *